(12) United States Patent
Rodgers

(10) Patent No.: US 7,893,385 B2
(45) Date of Patent: Feb. 22, 2011

(54) METHOD FOR ENHANCING GAIN AND RANGE OF AN RFID ANTENNA

(76) Inventor: James Neil Rodgers, 8853 214th Place, Langley, BC (CA) V1M 2H9

(*) Notice: Subject to any disclaimer, the term of this patent is extended or adjusted under 35 U.S.C. 154(b) by 588 days.

(21) Appl. No.: 11/681,171

(22) Filed: Mar. 1, 2007

(65) Prior Publication Data
US 2008/0217309 A1  Sep. 11, 2008

(51) Int. Cl.
B23K 26/36  (2006.01)
B23K 26/03  (2006.01)

(52) U.S. Cl. .............. 219/121.69; 219/121.83; 250/559.22

(58) Field of Classification Search ............ 219/121.68, 219/121.69, 121.83; 250/559.19, 559.22
See application file for complete search history.

(56) References Cited

U.S. PATENT DOCUMENTS

| | | | |
|---|---|---|---|
| 6,008,776 A | 12/1999 | Yarbrough et al. | |
| 6,900,892 B2 * | 5/2005 | Shchegrov et al. | 250/559.22 |
| 7,027,155 B2 * | 4/2006 | Cordingley et al. | 219/121.78 |
| 7,045,811 B2 | 5/2006 | Mattis | |
| 7,119,744 B2 | 10/2006 | Theobold et al. | |
| 7,336,376 B2 * | 2/2008 | Munzer | 250/559.19 |
| 7,469,831 B2 * | 12/2008 | Gu et al. | 219/121.62 |
| 7,681,301 B2 * | 3/2010 | Rodgers | 29/600 |
| 2004/0188531 A1 * | 9/2004 | Gengel et al. | 235/491 |
| 2006/0079062 A1 * | 4/2006 | Mazur et al. | 438/308 |
| 2006/0138102 A1 * | 6/2006 | Sawada et al. | 219/121.69 |
| 2006/0213880 A1 * | 9/2006 | Tanaka et al. | 219/121.69 |
| 2007/0130754 A1 * | 6/2007 | Fein | 29/600 |
| 2008/0216926 A1 * | 9/2008 | Guo et al. | 219/121.85 |

OTHER PUBLICATIONS

Huske, "A novel Laser-based Method to manufacture RFIDs", Dec. 2005, Proc. of SPIE, vol. 6157, pp. 61570A-1 to 61570A-5.*

* cited by examiner

Primary Examiner—Geoffrey S Evans

(57) ABSTRACT

Three dimensional nano structures created on copper or aluminum base metal through the use of a laser pulse device which results in an increase in radiation sensitivity of the metal. The base metal is used to manufacture RFID antennae after receiving a pulse of sharply focused laser ablation energy. The result is an increase in gain and range of the antennae. Furthermore, the antennae do not detune in the proximity of other antennae and are readable in a non perpendicular orientation.

9 Claims, 3 Drawing Sheets

RFID Antenna Gain and Range Enhancement -Effects of Laser Ablation

Figure 1: RFID Antenna Gain and Range Enhancement –Laser ablation
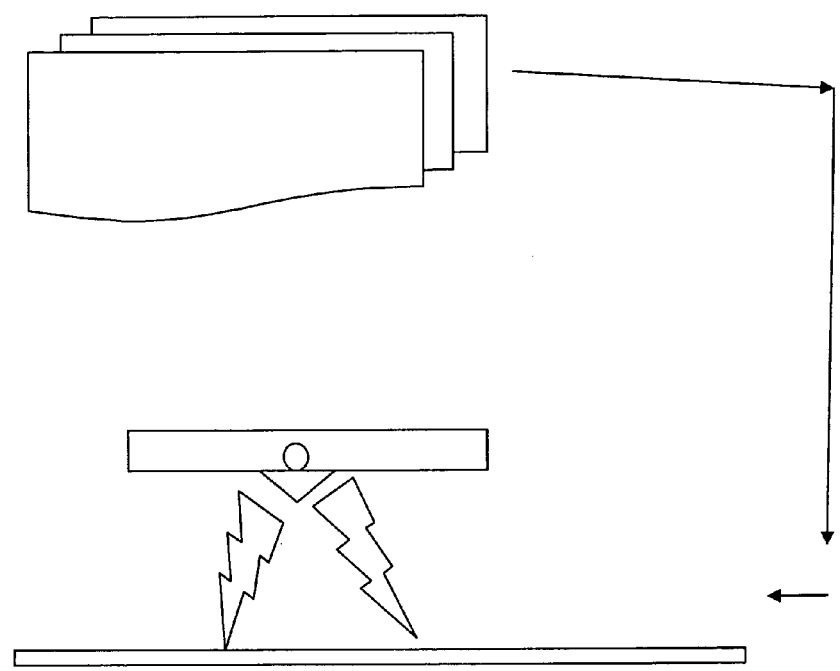

Figure 2: RFID Antenna Gain and Range Enhancement -Effects of Laser Ablation

Figure 3: RFID Antenna Gain and Range Enhancement -Reflectance measurements
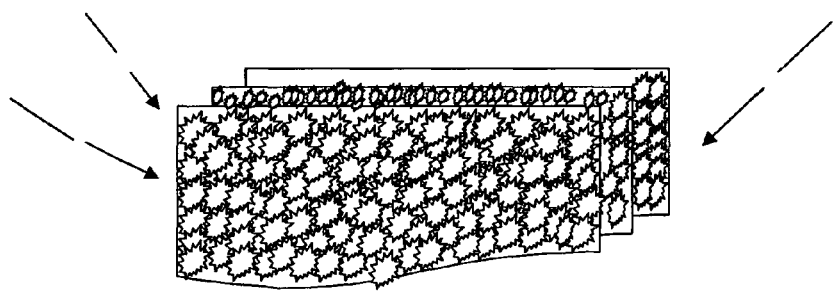

METHOD FOR ENHANCING GAIN AND RANGE OF AN RFID ANTENNA

CROSS REFERENCES TO RELATED APPLICATIONS

Not Applicable

STATEMENT REGARDING FEDERALLY SPONSORED RESEARCH AND DEVELOPMENT

Not Applicable

THE NAMES OF THE PARTIES TO A JOINT RESEARCH AGREEMENT

Not Applicable

INCORPORATION-BY REFERENCE OF MATERIAL SUBMITTED ON COMPACT DISC

Not Applicable

The methodology of RFID is to affix transponders, also known as tags, to cases, pallets, cartons, units, or other objects. The transponder transmits radio frequency electro magnetic signals. This transmission is triggered when the transponders are in the read zone of a stationary or mobile reader, also known as an interrogator. The reader captures or harvests the electro magnetic signal and decodes the unique EPC which identifies it. Using 96 bits the unique identifier includes name, class, and serial number of the product. Data from the EPC is decoded by the interrogator and matched with a record of the tracked item located in the database application of the host. Usually there is an enclosure around the integrated circuit chip and the antenna which acts to protect it and enables the tag, as a unit, to be attached to any object.

There are two types of tags available. Active tags continuously emit radio signals and are powered by a battery. These are typically of the read/write variety, proprietary and quite expensive. Passive tags use the power generated by the interrogation process and the tags backscatter or reflect data to the RFID reader. There is no internal power source for passive tags. Currently passive read only tags are the focus of most EPC innovation and development. This is because passive tags cost less than active tags and provide solid functionality.

The EPC focus is on UHF passive tags. For example there is the Type 0 read only tags which contain data. Furthermore, there is the 0+ read write tag which is standards based and allows transponders to be written in real time. Moreover, there are the read write Type 1 tags that can be written over by a reader as well as the Class 1, Generation 2 tags which have upgraded security and efficiency advantages over Gen 1 tags. Innovations in the technical features of Gen 2 tags include anti collision algorithms, increased memory capacity, smaller chip size plus increased cost efficiency.

The other important piece of any RFID system is the reader/interrogator side of the equation. There are handheld and fixed position models. The use for fixed readers include conveyor belt, portal or doorway reading, shrink wrap stations and pallet assembly stations. Handhelds are used by roving employees. Some of the innovations to readers include the dense reader mode that allows a large number of readers to concurrently communicate without interfering with each others' signals. Additionally, readers have been developed which support multiple antennas designed to reduce the cost of deployment as well as readers that can support multiple protocols, for example EPC Gen 1 and Gen 2 RFID tags.

One of the problems with RFID technology is that of orientation. This means that an RFID interrogator cannot communicate effectively with an RFID transponder if the transponder is oriented in a manner which is perpendicular to the antenna of the interrogator. In this respect, this is a similar problem to that encountered with commercial AM radio. For example, when attempting to improve reception from a weak radio signal it is commonplace to rotate the radio.

In some configurations the radio is not able to receive the AM signal at all. However, when rotated into correct position the AM signal can be received perfectly. Similarly, with a number of products on the shelf of a warehouse, distribution center, or retail shopping outlet, the orientation of some of the transponders may make them invisible to the probing electro magnetic signals emanating from the antenna of the interrogator.

Another problem with RFID technology is that of interrogator coordination. Most RFID interrogators are not designed to operate in the presence of other interrogators. This has not been a significant problem to date as RFID has had limited deployment. However, as the technology becomes ubiquitous there will be more opportunity for interrogator cross talk. In other words, a collision between the competing RFID interrogator signals causing a garbling of the data. Furthermore, there will be a detuning by one interrogator which is in close proximity to another interrogator causing transponder misreads. This problem is further exacerbated by the use of hand held interrogator devices which can roam as an operator moves and thus can interfere randomly with a fixed or another hand held device.

A further problem for the RFID industry is interrogator reading range for purposes of interpreting the data transmitted by transponders. In practice most of the lower frequency systems can read at a maximum distance of about a meter. With the UHF systems this can be extended to three to four meters. It is the goal of the RFID industry to interrogate large sections of a warehouse, distribution center or retail shopping outlet from a minimum of interrogator locations. Therefore, an invention which can increase read range of interrogators would be welcomed by the RFID industry.

The radio frequency identification (hereinafter "RFID") industry is based on an automated data collection system that enables businesses to wirelessly capture and move data using radio waves. A typical system consists of transponders or tags which contain an embedded unique identifier number. This identifier number is utilized to match information about the particular item being tracked with information in a database or host computer system. The data is read by interrogators which decode the data on the transponder. The decoded information is then sent to the host computer system for data interpretation.

The goal of RFID is to track items from the time that a product is manufactured to when it is consumer. The RFID system thereby offers real time visibility. Furthermore, items may be read or tracked with minimal human intervention.

The RFID industry is governed by the Electronic Product Code (referred to herein as "EPC"). This is a joint venture between the Uniform Code Council and the European Article Numbering Association. This is the main organizational body involved in the standardization of the electronic product code which is widely used and accepted in RFID systems. Electronic Product Code is also an open standard that serves two important purposes. Suppliers of RFID technology can develop products such as transponders and interrogators to one published standard. This makes these items more affordable to develop. Similarly, customers have more vendor choices and are assured that the products conforming to the EPC standard are truly interoperable.

DESCRIPTION OF THE RELATED ART

The science which buttresses this invention includes research by Singh, Alexander, Schiffern and Doerr form the Department of Electrical Engineering and Center for Electro-Optics from the University of Nebraska-Lincoln which indicates that irradiating metal surfaces such as aluminum or gold causes roughness and formation of micro and nano sized surface structures. This research confirms that absorption rates increase after laser ablation and provides laser machining parameters (settings and measurements) which most effectively rearrange the reflectance and absorption values of the metals which are laser blasted. This study also attempts to propose theories as to how the shape, size and material properties of the micro and nano sized surface structures physically operate in the absorption and scattering of light. This study can be distinguished from the current invention as it does not contemplate RFID, antennas or radio frequency transmission.

Collateral research indicates that ultra second blasts of laser light can be confined to collateral damage of less than 10 nanometers. This research confirms that the alterations to physical properties on aluminum can be controlled and precisely machined. Research by Korte, Koch, Serbin, Ovsianikov, Chichkov, indicates that nano structures down to the 100 nano meter level are possible. The report indicates that this technology is of a nonlinear multiphoton laser matter interaction process. It is used to overcome the diffraction of metals by forming nano structures on metals. This research does not contemplate RFID, antennas or radio wave transmission.

Further research by Ahmad, from Solid State Physics Laboratory, Timarpur, Delhi and Tripathi of the Physics Department, Indian Institute of Technology, New Delhi indicates that nano size roughness can be modeled as a plane surface embedded with clusters. The research indicates that the subject metal surface undergoes field enhancement when laser frequency equals the frequency of surface charge oscillations. The research indicates that this enhanced field causes increased absorption of the laser pulse. The model suggests that the increase in absorption of radiation decreases with the increase of the laser power. This research does not contemplate RFID, antennas or radio wave transmission. American research originating from the University of Rochester, The Institute of Optics, reports on enhanced absorptance of gold following multipulse femtosecond laser ablation. Vorobyev and Guo report that nano structuring of metal can enhance the absorptance rate by a factor of three. They further report that with a large number of applied pulses the absorptance rate can reach 100%. This research does not contemplate RFID, antennas or radio wave transmission.

A Cisco patent, U.S. Pat. No. 7,119,744, issued Oct. 10, 2006, contemplates configurable antennas for a wireless access point. The inventive step in this patent is to improve antenna signals using a plurality of antennas with elements which isolate structure. The isolating structure is formed of material having displaceable properties which are obtained through use of nano technology. The technology contemplated in the Cisco patent is Micro Electro Mechanical Systems. The present invention contemplates the use of femtosecond laser ablation to create three dimensional structural changes to the base metallic building materials of RFID interrogator antennas for the purpose of improving electro magnetic signal receptivity.

A patent of the University of Utah, U.S. Pat. No. 7,045,811, Issued May 16, 2006, contemplates fabrication of artificial atoms and molecules to be used as building blocks for molecular devices. This is accomplished through particle localization by geometrical nano structuring. The patent describes the use of artificial lattices made from artificial atoms and molecules which create artificial networks as arrays. The University of Utah patent contemplates its patent for use in transistors, power and signal amplifiers. Although one embodiment of this patent is improvement of electro magnetic signaling it does not contemplate the use of femtosecond laser ablation to create three dimensional structures on base material used for construction of RFID interrogator antennas.

A patent owned by The Aerospace Corporation, U.S. Pat. No. 6,008,776, issued Dec. 28, 1999, contemplates the use of micro machined reflector antennas which operate on an integrated circuit. This invention uses nanotechnology to create a reflective coating for an antenna system however its application is to communication satellites. It does not contemplate the application of femtosecond laser ablation to create three dimensional nano structures on the base material of RFID interrogator antennas.

BRIEF SUMMARY OF THE INVENTION

This invention concentrates on the reader side of the equation. From a cost benefit or return on investment point of view, the reader side of the RFID equation makes more sense to develop. This is because one reader can service millions of tags. Therefore, it is more cost effective to innovate from the reader side rather than the tag side. For example, upgrades to the readers are relatively less expensive to the deploying or developing entity as fewer readers are needed in comparison to tags in an RFID system. Concurrently, innovations to readers allow deployment of the least expensive type of passive tags.

This invention focuses on innovation on the reader side of the RFID equation and specifically to one component of the reader; the antenna. An antenna is measured by its ability to gain. Gain refers to the antenna's ability to receive signals at a specific frequency and specific range. Interrogator antennas are fairly simple; however, they could benefit from innovation as readers, along with their antennas, need to be placed on miles and miles of shelves.

One aspect of this invention is to take ordinary antenna building materials, such as copper or aluminum, and subject these materials to an intense blast of laser light. The result is a metallic structure with pits, globules and strands which dramatically increase the area of the surface of the metal suffering laser ablation. This has the effect of improving the ability of the base metal of the antenna to capture or harvest radiation by a factor of at least three.

The laser blast or ablation causes nanostructures to form on the metals being treated. These nanostructures are the result of changes to the physical properties of the metal used to make antennas. These changes increase the ability of the metal to harvest or capture radiation. The more surface area available on the metal which makes up the base material of the antenna, the more surface area is available for the radiation to be absorbed into. The science in this area indicates that laser blackening of metals increases absorption rates by at least 100%. This means that antennas treated with laser light will increase efficiency by 100% or more.

The process is known as a femtosecond laser pulse. The laser burst lasts only a few quadrillionths of a second. For the purposes of comparison, a femtosecond is to a second what a second is to about 32 million years. By way of further comparison during this brief burst the laser unleashes as much power as the entire grid of North America onto a spot the size of a needle point.

BRIEF DESCRIPTION OF THE SEVERAL VIEWS OF THE DRAWINGS

FIG. 1: Provides a schematic illustration of the laser ablation of base metal sheets to be used for RFID antennas FIG. 3: Provides a schematic illustration of the step of reflectance measurements of ablated metal sheets are made to verify there are sufficient 3 dimensional structures to adequately increase sensitivity of antennas

DETAILED DESCRIPTION OF THE INVENTION

Figure 2A:
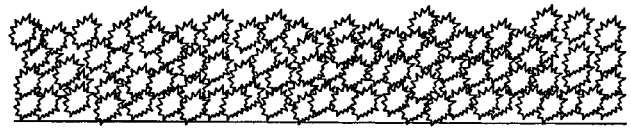
FIG. 2: Provides a schematic illustration of the effects of femtosecond laser ablation of metal which comprises the base material to be used in the construction of RFID antennas to increase radiation sensitivity and to increase the gain and range of same
Figure 2B:
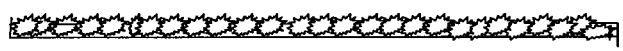

This invention uses three dimensional nano structuring caused by femtosecond laser pulses to increase the sensitivity of an antenna designed for an RFID interrogator/reader. It is contemplated that commercial sheets of aluminum or copper will be treated with femtosecond laser pulses to increase their radiation absorption rate and therefore increase their sensitivity to electro magnetic signals. The absorption rate is equivalent to the degree to which electro magnetic energy, or radiation, is captured or harvested by base antenna material.

This base material, whether copper or aluminum, is then used as the base material to manufacture reader/interrogator antennas at a commercial level. These antennas, of whatever design, will demonstrate at least a 100% increase in sensitivity. This fact is published in the peer reviewed scientific research enclosed herein. This increase in sensitivity will obviate the problems of detuning due to proximity of other antennas or wrong orientation of the antenna in relationship to the tags as the harvest or capture rate of the antenna will increase dramatically. Furthermore, this method will dramatically increase the read range of RFID interrogators. This is because any antenna manufactured with base materials treated with the femtosecond laser ablation technique will have enhanced radiation absorption due to three dimensional nano structures on the surface of the base building material. This increased sensitivity assists the antenna to harvest or capture electro magnetic signals in a noisy environment by allowing the reader to fine tune its reception to the group of tags to be read. The result is less detuning, the ability to read tags at any orientation and increased read range.

The scientific research supports a model whereby the laser ablation process blackens the surface of metal using a TI: Sapphire Femto-Second laser to increase electro magnetic absorption rates. Reflectance measurements are made to analyze the surface properties of the metal base material to determine the parameters of the reflectance values. Standard scientific measuring processes, well known to the researchers, are used to make this determination. Furthermore, the science reveals precise laser pulse durations to confine collateral damage on the surface of the base metal materials and discloses that technologies of the nonlinear multi photon laser matter interaction processes are required.

The laser blast should be at a frequency equivalent to the surface charge oscillations of the base metal material and can be manipulated in duration and number of laser pulses to incrementally raise absorption rates. This laser ablation process creates nano cavities, nano rims and nano protrusions on the base metal material.

The useful, non-obvious and novel steps of this invention are:

1.) The use of a femtosecond laser ablation technique to create three dimensional nano structures on the base material of interrogator antennas to improve the receptivity of the manufactured antenna to radiation in the form of electromagnetic signals. In a preferred embodiment the base material for constructing an RFID interrogator antenna, for example copper or aluminum, is purchased in bulk sheets. The manufacturer of the RFID interrogator antenna would use a generic laser pulse device to ablate the surface of the copper or aluminum sheets with a femtosecond of laser energy. The copper or aluminum sheets would then be used in the manufacture of the antenna for an RFID interrogator or transponder in the usual manner preferred by the manufacturer.

The invention claimed is:

1. A method for enhancing the gain and range of RFID antennas and facilitating the production of RFID antennas that do not detune in the presence of other antennas said system comprising: providing sheets of metal base material suitable for manufacture into radio frequency identification antennas; employing a laser pulse with sufficient fluence to ablate a metal base sheet with a pulse of sharply focused femtosecond laser ablation energy to create three dimensional nano structures on the metal base material to increase the radiation sensitivity of the base metal sheet material; performing reflectance measurements of the metal base material, subsequent to the laser ablation process, through the use of ellipsometry and integrating sphere as well as Energy Dispersive X rays, X ray Photoelectron Spectroscopy and Augur Emission Spectroscopy techniques to analyze the surface properties of the metal base material to determine the parameters of the reflectance values of the laser machined metal base material for the purpose of verifying the presence of sufficient three dimensional nano structures to adequately increase the sensitivity of the antenna metal base material.

2. The method of claim 1 wherein further the femtosecond laser ablation is limited to the metal base material which comprises the elements of a radio frequency identification antenna for the purpose of increasing the radiation sensitivity of the metal base material used in the construction of the RFID antenna to increase the gain and range of same.

3. The method of claim 1 wherein the laser pulse device used to treat produced bulk sheets of the metal base material is of a Ti:Sapphire Femto-Second laser used for machining metal surfaces for the purpose of increasing the radiation sensitivity of the metal base material used in the construction of the RFID antenna to increase the gain and range of same.

4. The method of claim 1 wherein the laser ablation process blackens the surface of the metal base material creating surface roughness and formation of micro and nano sized structures for the purpose of increasing the electro magnetic absorption rate of the metal base material used in the construction of the RFID antenna to increase the gain and range of same.

5. The method of claim 1 wherein femtosecond laser pulses of high intensity light are less than a picosecond but long enough duration in femtoseconds to reach the ablation threshold yet short enough to confine collateral damage on the base metal material to less than 10 nanometers.

6. The method of claim 1 wherein the femtosecond laser pulses emanate from technologies of the nonlinear multi photon laser matter interaction processes thereby allowing the ablation process to overcome the diffraction limit for the purpose of fabricating three dimensional nano structures on the base metal materials.

7. The method of claim 1 wherein femtosecond laser pulse is unleashed at a frequency which equals the frequency of surface charge oscillations on the base metal material thereby increasing absorption of the laser pulse.

8. The method of claim 1 wherein femtosecond laser ablation can be applied at a sufficiently high fluence and with a multitude of applied pulses for the purpose of raising the absorption rate to 100% on the base metal materials.

9. A Radio Frequency Identification (RFID) method for enhancing the gain and range of antennas and facilitating the production of antennas that do not detune in the presence of other antennas comprising: providing sheets of metal base material suitable for manufacture into radio frequency identification antennas; employing a laser pulse device with sufficient fluence to ablate a metal base sheet with a pulse of sharply focused femtosecond laser ablation energy to create three dimensional nano structures on the metal base material to increase the radiation sensitivity of the base metal sheet material; performing reflectance measurements of the metal base material, subsequent to the laser ablation process, through the use of ellipsometry- and integrating sphere as well as Energy Dispersive X rays, X ray Photoelectron Spectroscopy and Augur Emission Spectroscopy techniques which are used to analyze the surface properties of the metal base material to determine the parameters of the reflectance values of the laser machined metal base material for the purpose of verifying the presence of sufficient three dimensional nano structures to adequately increase the sensitivity of the antenna metal base material: and further wherein the three dimensional nano structures are developed from a process of a nano scale melt which relocates the base metal material from the center of the melted site to peripheral areas resulting in nano cavities, nano rims, and nano protrusions for the purpose of raising the absorption rate on the base metal materials.

* * * * *